United States Patent
Nadel et al.

(10) Patent No.: US 11,057,466 B2
(45) Date of Patent: Jul. 6, 2021

(54) METHOD AND SYSTEM FOR GENERATING OUT-OF-BAND NOTIFICATIONS OF CLIENT ACTIVITY IN A NETWORK ATTACHED STORAGE (NAS) DEVICE

(71) Applicant: Dell Products L.P., Round Rock, TX (US)

(72) Inventors: Gil Nadel, Tel Aviv (IL); Dina Fine, Herzlia (IL)

(73) Assignee: Dell Products L.P., Round Rock, TX (US)

(*) Notice: Subject to any disclaimer, the term of this patent is extended or adjusted under 35 U.S.C. 154(b) by 200 days.

(21) Appl. No.: 14/985,654

(22) Filed: Dec. 31, 2015

(65) Prior Publication Data

US 2017/0195196 A1 Jul. 6, 2017

(51) Int. Cl.
| | |
|---|---|
| *G06F 15/173* | (2006.01) |
| *H04L 29/08* | (2006.01) |
| *G06F 3/06* | (2006.01) |
| *H04L 12/26* | (2006.01) |

(52) U.S. Cl.
CPC .......... *H04L 67/1097* (2013.01); *G06F 3/061* (2013.01); *G06F 3/067* (2013.01); *G06F 3/0659* (2013.01); *H04L 43/02* (2013.01); *H04L 43/04* (2013.01); *H04L 43/06* (2013.01)

(58) Field of Classification Search
CPC . H04L 43/08; H04L 67/1097; H04L 63/1416; H04L 43/06; H04L 43/04; H04L 43/02; H04L 12/00; H04L 67/1095; G06F 3/067; G06F 3/06; G06F 3/061; G06F 3/0659
See application file for complete search history.

(56) References Cited

U.S. PATENT DOCUMENTS

| | | | |
|---|---|---|---|
| 7,069,317 B1* | 6/2006 | Colrain | G06F 11/2025 709/224 |
| 2005/0086384 A1* | 4/2005 | Ernst | H04L 12/00 709/248 |
| 2012/0173713 A1* | 7/2012 | Wang | G06F 11/073 709/224 |
| 2013/0086006 A1* | 4/2013 | Colgrove | G06F 17/30159 707/692 |
| 2013/0166690 A1* | 6/2013 | Shatzkamer | H04N 21/25891 709/219 |

(Continued)

*Primary Examiner* — John B Walsh
(74) *Attorney, Agent, or Firm* — Pearl Cohen Zedek Latzer Baratz LLP

(57) ABSTRACT

A method, a system, and non-transitory computer readable medium for generating out-of-band notifications of client activity in a network attached storage (NAS) device are provided herein. The method may include the following steps: monitoring a file system implemented on a NAS device to derive file activity data associated with file operations originated by clients; aggregating the file activity data on a notification queue; and sending notification messages to an external server, wherein the notification messages include at least some of the aggregated file activity data updated to a time of sending the notification message. In accordance with embodiments of the present invention, file operations originated by clients are carried out uninterruptedly by the aggregating of the file activity data and the sending of the notification messages.

15 Claims, 3 Drawing Sheets

(56) References Cited

U.S. PATENT DOCUMENTS

| | | | |
|---|---|---|---|
| 2014/0280500 A1* | 9/2014 | Ambach | G06F 16/178 709/203 |
| 2015/0074164 A1* | 3/2015 | Boger | G06F 11/3006 709/201 |
| 2015/0082376 A1* | 3/2015 | McNair | H04L 63/20 726/1 |
| 2016/0119867 A1* | 4/2016 | Garg | H04W 52/0206 370/311 |
| 2017/0054828 A1* | 2/2017 | Ling | H04L 67/325 |

* cited by examiner

METHOD AND SYSTEM FOR GENERATING OUT-OF-BAND NOTIFICATIONS OF CLIENT ACTIVITY IN A NETWORK ATTACHED STORAGE (NAS) DEVICE

FIELD OF THE INVENTION

The present invention relates generally to the field of storage, and more particularly to distributed shared files systems implemented on network attached storage (NAS) devices.

BACKGROUND OF THE INVENTION

FIG. 1 is a block diagram illustrating non-limiting exemplary architecture of a Network Attached Storage (NAS) device 100 implementing a distributed shared file system in accordance with the prior art. Distributed file server 120 may include a plurality of nodes (aka controllers) 130-1 to 130-x connected to a bus 180 operating in Internet Small Computer Systems Interface (iSCSI), a fiber channel (FC) or the like.

Bus 180 connects distributed file server 120 to a plurality of block storage devices 190 possibly configured as a part of a Storage Area Network (SAN) device aligned, for example, in a Redundant Array of Independent Disks (RAID) configuration.

Each of nodes 130-1 to 130-x may include a central processing unit (CPU) 160-1 to 160-x respectively, and memory units 150-1 to 150-x respectively, on which several processes are being executed. Nodes 130-1 to 130-x may communicate with a plurality of clients over network protocols such as Network File System (NFS) and Server Message Block (SMB).

Some of the processes running over nodes 130-1 to 130-x may include file system daemons (FSDs) 170-1 to 170-x. Each of nodes 130-1 to 130-x may include one or more FSDs which serve as containers for services and effectively control files in distributed file server 120.

Files in distributed file server 120 are distributed across FSDs 170-1 to 170-x and across nodes 130-1 to 130-x. Distributed file server 120 may also include file servers 140-1 to 140-x in at least one of nodes 130-1 to 130-x, wherein each of file servers 140-1 to 140-x may receive file system connect requests 112 from clients such as client machine 110.

Such client machine 110 may include, in a non-limiting example, Windows™ clients communicating over Server Message Block (SMB) protocol. Upon receiving such a connect request, servers 140-1 to 140-x refer the requests to one of FSDs 170-1 to 170-x that holds the required file. Once a file is accessed, many other operations may be requested by a user via client machine 110.

A typical NAS device such as NAS device 100 can usually provide service to tens of thousands of clients accessing billions of files. The NAS device is traditionally responsible for certain activities (such as controlling access to files based on standard protocol permission types, and protecting files from data-loss). However, there are further capabilities that may be provided by third party software vendors.

Such capabilities may include: auditing of user-activity, maintaining a usage profile of the files, indexing file contents, and the like. One common attribute of all the above capabilities is that they do not authorize any activity. In other words, they do not provide feedback to the NAS device indicative of whether a specified operation is permitted or not.

Currently available NAS devices employ mechanisms of forwarding notifications relating to user activity to external servers. Some of these implementations known in the art employ an additional gateway server running a dedicated software to mediate between the NAS device and the third party software.

However, all of the aforementioned notification mechanisms known in the art are designed as in-band authorization service: the NAS device halts the user operation, sends details about the operation to the external server, and waits for its approval or denial. Only when a response from the external server returns will the NAS device allow the user operation or return an error to the user.

Examples for such suites applications may include an anti-virus which enables to verify a file to letting a user access it. Another example may include archiving in which a file is being recovered before allowing a user to open a file that was archived.

It would be therefore advantageous to have a NAS device that implements a mechanism that reliably provides a list of recent operations to an external server, without impacting user operations or incurring a performance penalty.

SUMMARY OF THE INVENTION

Embodiments of the present invention provide a method, a system, and non-transitory computer readable medium for generating out-of-band notifications of client activity in a network attached storage (NAS) device. The method may include the following steps: monitoring a file system implemented on a Network Attached Storage (NAS) device to derive file activity data associated with file operations originated by clients; aggregating the file activity data on a notification queue; and sending notification messages to an external server, wherein the notification messages include at least some of the aggregated file activity data updated to a time of sending the notification message. In accordance with embodiments of the present invention, file operations originated by clients are carried out uninterruptedly by the aggregating of the file activity data and the sending of the notification messages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
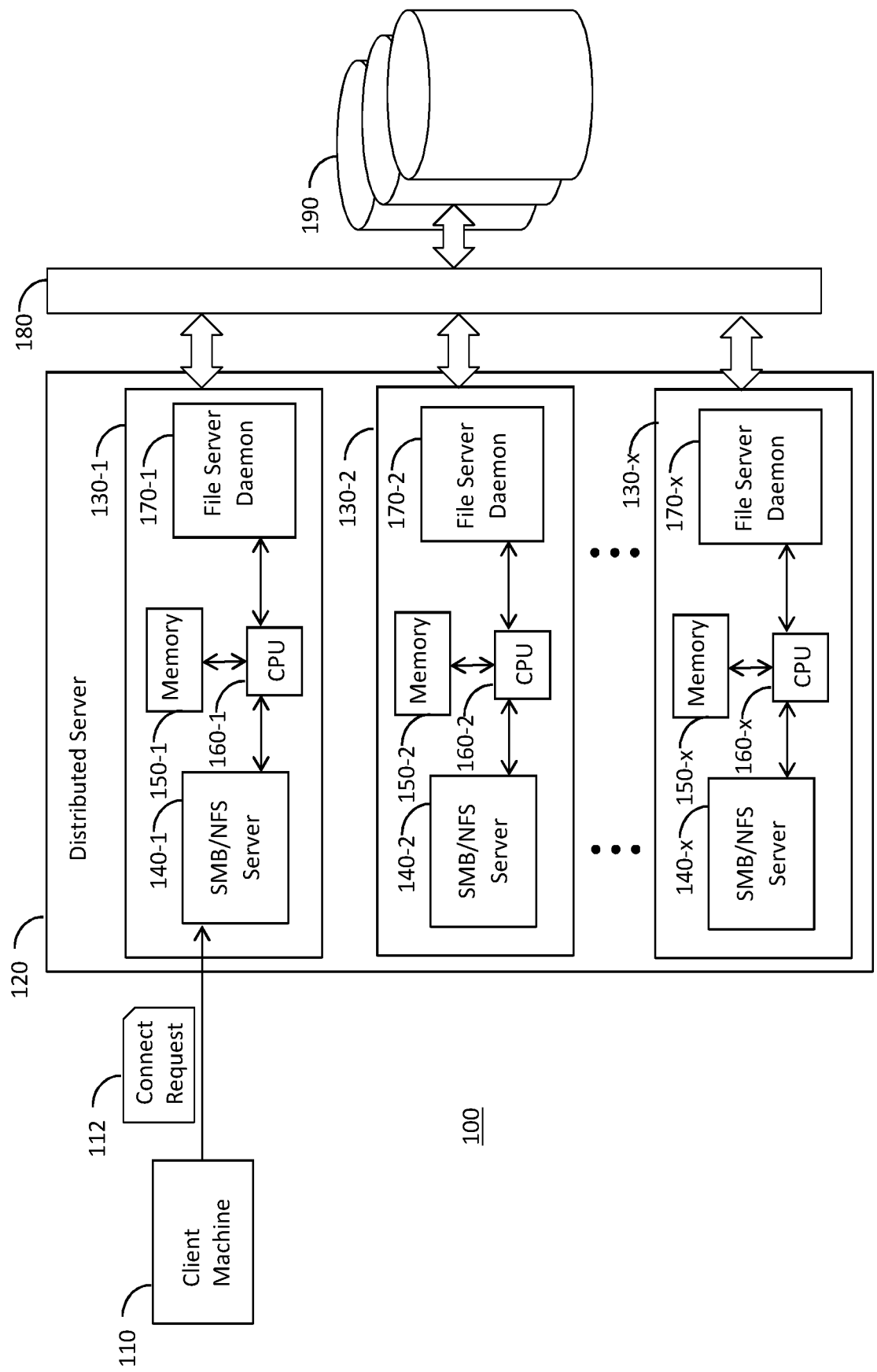
FIG. 1 is a block diagram illustrating non-limiting exemplary architecture of a system in accordance with embodiments of the prior art.
Figure 2:
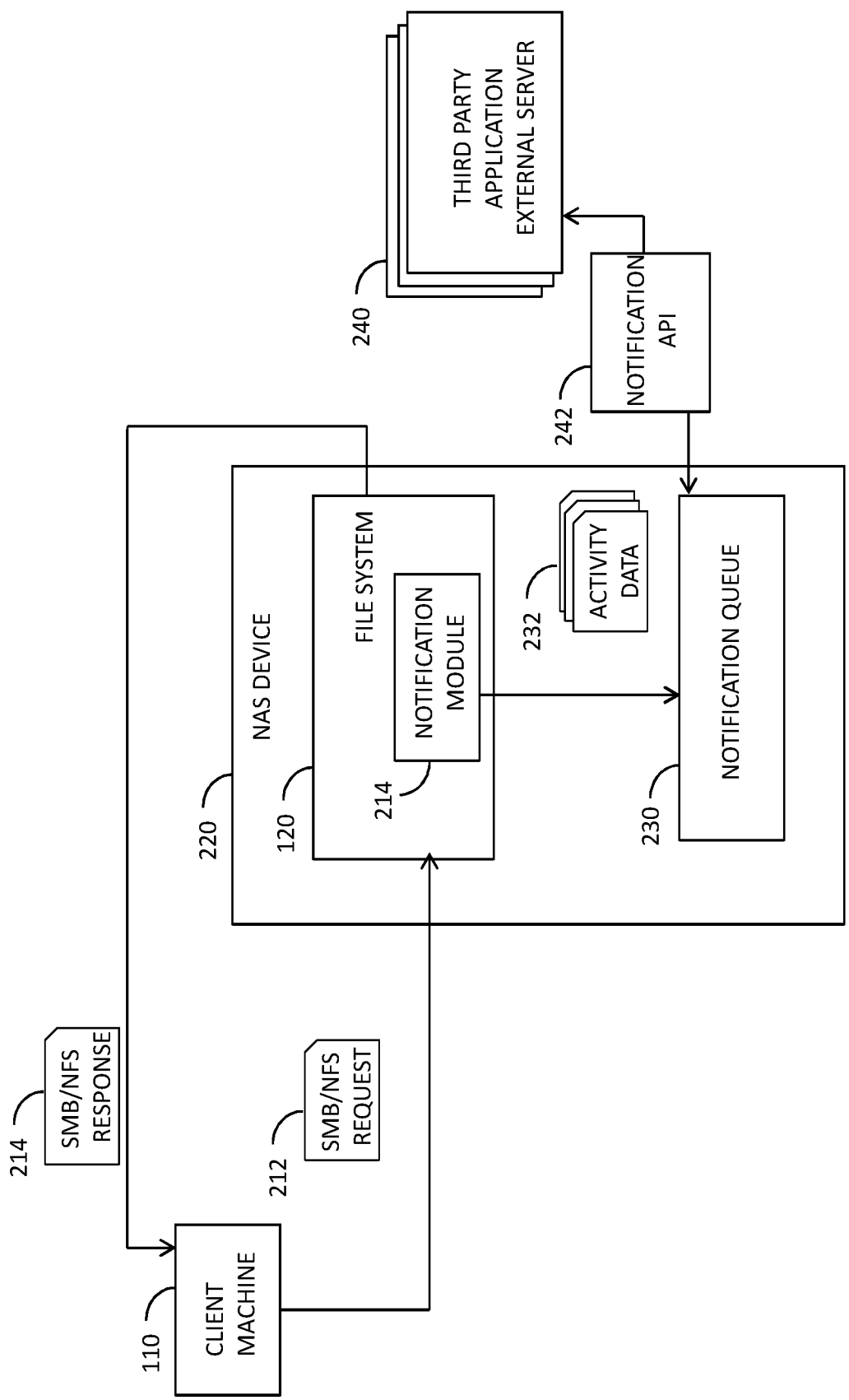
FIG. 2 is a block diagram illustrating non-limiting exemplary architecture of a system in accordance with embodiments of the present invention.

FIG. 2 is a block diagram illustrating non-limiting exemplary architecture of a system in accordance with embodiments of the present invention. A NAS device 220 is depicted here as including a file system 120 which may be similar in architecture and functionality to the file system depicted in greater detail in FIG. 1. In accordance with embodiments of the present invention NAS device 220 includes a notification queue 230 which is a data structure configured to hold activity data 232 obtained from file system 120 during its operation. Notification queue 230 is configured to store and manage the activity data 232 and communicate it via a notification Application Programming Interface (API) 242 to a third party application located on server 240 that is external to file system 120.

In operation, user in the form of a client machine 110 may send a request for operation 212 directed at file system 120. As part of the usual workflow of file system 120, a response 214 is returned to client machine 110. By and by, various sub processes are taking place in relation to request 212 and response 214. Specifically, attributes associated with the user, the file and the operation requested are being monitored and addressed. All of the activity related to the user and the operation requested by them can be monitored and stored by notification queue 230.

An important property of notification queue 230 is that it employs a notification mechanism that works out-of-band so that it does not interrupt any user activity over file system 120. While the user activity data is stored, notification queue 230 further informs external server running third party software 240 of operations that took place on NAS device 220.

At notification queue 230 the notifications indicating activity data 232 await dispatch to the external server. In accordance with some embodiments of the present invention, as these events wait on notification queue 230, they might be consolidated to conserve queue memory, network bandwidth, and resources on the external server. By way of an illustrative non-limiting example, multiple sequential read operations can be consolidated into a single read notification, thereby saving memory space.

In accordance with some additional embodiments of the present invention, NAS device 220 may detect activity that might be unnecessary by third party application operating on external server 240. In such a case, such unnecessary activity (notification) is removed from notification queue 230. By way of an illustrative non-limiting example, in many cases applications generate temporary files and perform multiple operations such as: creating the file, populating it with some data, renaming it, and eventually deleting the file. It might be that for many cases all this information is redundant. Notably, there is no need to audit such activity or index temporary files. Therefore, by identifying such temporary activity while the notifications wait on notification queue 230, NAS device 220 may reduce overhead on the system and network.

In accordance with some additional embodiments of the present invention, any notification message will include the full details about the user operation that is already available on NAS device 220 at that point of time. For example, the message can include both user name and ID, allowing the third party software appliance to choose which one it requires. Advantageously, and compared with currently available NAS devices employing file systems such as file system 120 using the proposed out-of-band notification mechanism can reduce the amount of work the external application needs to perform, leading to higher throughput.

In accordance with some additional embodiments of the present invention, the third party software needs to acknowledge receipt of the notification, at which point the notification can be removed from notification queue 230.

In accordance with some additional embodiments of the present invention, NAS device 220 supports a load-balancing mechanism, in case multiple external servers can handle a common set of notifications.

Figure 3:
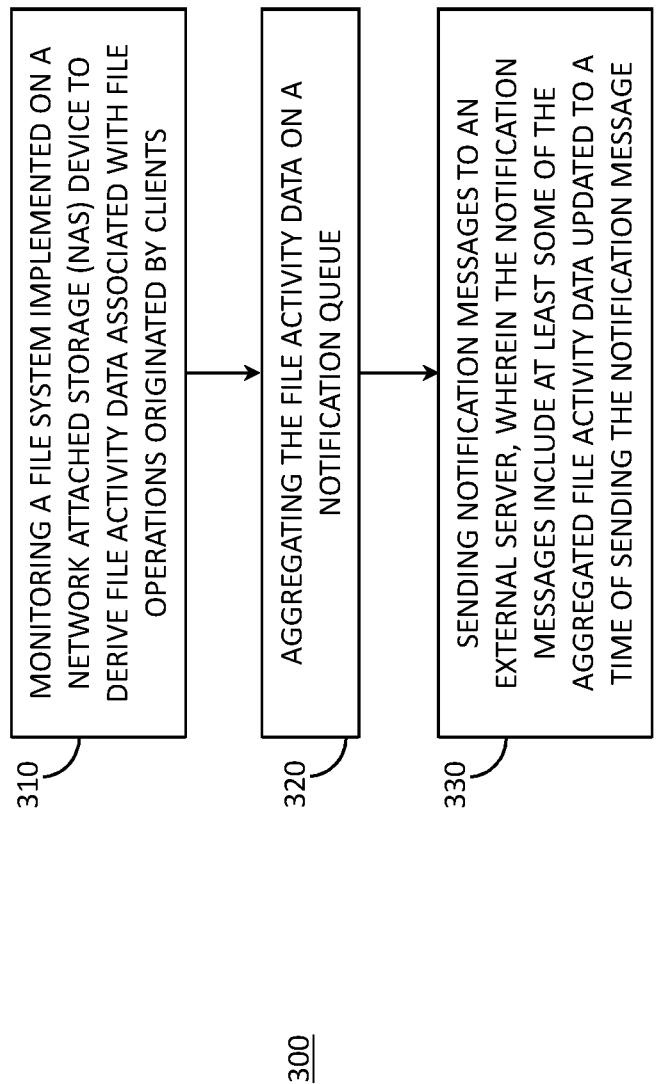
FIG. 3 is a high level flowchart illustrating a non-limiting exemplary method in accordance with embodiments of the present invention.

FIG. 3 is a high level flowchart illustrating a non-limiting exemplary method of generating out-of-band notifications of client activity in a NAS device in accordance with embodiments of the present invention. Method 300 may be implemented by any NAS device and is not necessarily limited to the aforementioned architectures of NAS devices 100 or NAS device 220.

Method 300 may include the following steps: monitoring a file system implemented on a Network Attached Storage (NAS) device to derive file activity data associated with file operations originated by clients 310; aggregating the file activity data on a notification queue 320; and sending notification messages to an external server, wherein the notification messages include at least some of the aggregated file activity data updated to a time of sending the notification message 330. In accordance with embodiments of the present invention, file operations originated by clients are carried out uninterruptedly by the aggregating of the file activity data and the sending of the notification messages.

Advantageously over an in-band mechanism, the out-of-band mechanism in accordance with embodiments of the present invention may help achieve the following targets: placement in a local queue is quite faster than communicating with an application running in an external server; consolidation of multiple notifications can reduce overhead on systems and network; and redundant notifications can be detected and removed.

It should be noted that the method according to embodiments of the present invention may be stored as instructions in a computer readable medium to cause processors, such as central processing units (CPU) 160-1 to 160-x, on nodes 130-1 to 130-x to perform the method. Additionally, the method described in the present disclosure can be stored as instructions in a non-transitory computer readable medium, such as storage devices 190 which may include hard disk drives, solid state drives, flash memories, and the like. Additionally non-transitory computer readable medium can be memory units 150-1 to 150-$x$ which reside on nodes 130-1 to 130-$x$ of distributed file server 120.

In accordance with embodiments of the present invention, a non-transitory computer readable medium may include a set of instructions that when executed cause at least one processor to: monitor a file system implemented on a Network Attached Storage (NAS) device to derive file activity data associated with file operations originated by clients; aggregate the file activity data on a notification queue; and send notification messages to an external server, wherein the notification messages include at least some of the aggregated file activity data updated to a time of sending the notification message 330. In accordance with embodiments of the present invention, file operations originated by clients are carried out uninterruptedly by the aggregating of the file activity data and the sending of the notification messages.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for generating out of band notifications in a Network Attached Storage Device, comprising:
    monitoring a distributed shared file system implemented on a Network Attached Storage (NAS) device to derive activity data, wherein said activity data includes file system operation requests originated by clients, a file associated with the file system operation requests and attributes associated with the clients;
    aggregating the activity data on a notification queue; and
    sending out of band notification messages to a third-party application on an external server, wherein the notification messages include at least some of the aggregated activity data updated to a time of sending the notification message,
    wherein said file system operations requests originated by the clients are carried out uninterruptedly by said aggregating of the activity data and said sending of the out of band notification messages, so as to not interrupt any client activity over the shared file system, and
    wherein the notification queue consolidates similar notifications into a single notification and deletes redundant notifications associated with activity that is unnecessary for at least one of auditing and indexing operations of the third-party application on the external server.

2. The method according to claim 1, further comprising consolidation of multiple notifications of similar properties prior to the sending of the out-of-band notification messages.

3. The method according to claim 1, further comprising detecting and removing redundant notifications prior to the sending of the out-of-band notification messages.

4. The method according to claim 1, wherein the aggregating of the activity data on the notification queue is carried out locally on the NAS device.

5. The method according to claim 1, wherein the out-of-band notification message includes full details about the user operation that is already available on NAS device.

6. A system for generating out-of-band notifications in a Network Attached Storage Device (NAS), comprising:
   a distributed shared file system comprising a plurality of nodes, each having a computer processor, a memory, and a plurality of processes executed by said computer processor, wherein the nodes are connected via a network interface to at least one storage device;
   a notification module configured to monitor said distributed shared file system to derive activity data, wherein said activity data includes file system operation requests originated by clients, a file associated with the file system operation requests and attributes associated with the clients;
   a notification queue configured to aggregate the activity data on a notification queue; and
   a notification application configured to send out-of-band notification messages to a third-party application on an external server, wherein the notification messages include at least some of the aggregated activity data updated to a time of sending the out of band notification message,
   wherein said file operations requests originated by the clients are carried out uninterruptedly by said aggregating of the activity data and said sending of the notification messages, so as to not interrupt any client activity over the shared file system, and
   wherein the notification queue consolidates similar notifications into a single notification and deletes redundant notifications associated with activity that is unnecessary for at least one of auditing and indexing operations of the third-party application on the external server.

7. The system according to claim 6, the notification queue is further configured to consolidate of multiple notifications of similar properties prior to the sending of the out-of-band notification messages.

8. The system according to claim 6, wherein the notification queue is further configured to detect and remove redundant notifications prior to the sending of the out-of-band notification messages.

9. The system according to claim 6, wherein the notification module and the notification queue are implemented locally on the file system.

10. The method according to claim 1, wherein the out-of-band notification messages include full details about the user operation that is already available on the file system.

11. A non-transitory computer readable medium comprising a set of instructions that when executed cause at least one processor to:
   monitor a file system implemented on a Network Attached Device (NAS) device to derive activity data, wherein said activity data includes file system operation requests originated by clients, a file associated with the file system operation requests and attributes associated with the clients;
   aggregate the activity data on a notification queue; and
   send out-of-band notification messages to a third-party application on an external server, wherein the notification messages include at least some of the aggregated activity data updated to a time of sending the notification message,
   wherein said file operations requests originated by the clients are carried out uninterruptedly by said aggregating of the activity data and said sending of the out-of-band notification messages so as to not interrupt any client activity over the shared file system, and
   wherein the notification queue consolidates similar notifications into a single notification and deletes redundant notifications associated with activity that is unnecessary for at least one of auditing and indexing operations of the third-party application on the external server.

12. The non-transitory computer readable medium according to claim 11, wherein the notification queue is further configured to consolidate of multiple notifications of similar properties prior to the sending of the out-of-band notification messages.

13. The non-transitory computer readable medium according to claim 11, wherein the notification queue is further configured to detect and remove redundant notifications prior to the sending of the out-of-band notification messages.

14. The non-transitory computer readable medium according to claim 11, wherein the monitoring and the aggregating are implemented locally on the file system.

15. The non-transitory computer readable medium according to claim 11, wherein the out-of-band notification messages include full details about the user operation that is already available on the file system.

* * * * *